US008417500B2

(12) United States Patent  (10) Patent No.: US 8,417,500 B2
Mazeau et al.  (45) Date of Patent: Apr. 9, 2013

(54) SENSOR SIMULATION SYSTEM

(75) Inventors: Gilles Mazeau, Beauzelle (FR);
Christophe Vlacich, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/375,640

(22) PCT Filed: Jul. 30, 2007

(86) PCT No.: PCT/FR2007/001313
§ 371 (c)(1),
(2), (4) Date: Jan. 29, 2009

(87) PCT Pub. No.: WO2008/015333
PCT Pub. Date: Feb. 7, 2008

(65) Prior Publication Data
US 2009/0265153 A1  Oct. 22, 2009

(30) Foreign Application Priority Data

Jul. 31, 2006  (FR) ..................... 06 06990

(51) Int. Cl.
*G06F 17/50*  (2006.01)
(52) U.S. Cl.
USPC ........................................................ 703/13
(58) Field of Classification Search ................ 703/4, 13
See application file for complete search history.

(56) References Cited

U.S. PATENT DOCUMENTS

| 4,806,881 A | * | 2/1989 | Ives et al. | 332/108 |
| 5,701,598 A | * | 12/1997 | Atkinson | 455/161.2 |
| 2008/0123777 A1 | * | 5/2008 | Trager et al. | 375/316 |
| 2009/0216511 A1 | * | 8/2009 | Babel et al. | 703/13 |

FOREIGN PATENT DOCUMENTS

| EP | 0 305 187 | 3/1989 |
| EP | 305187 A2 | * 3/1989 |

OTHER PUBLICATIONS

Weining Ni, "A Direct Digital Frequency Synthesizer with Single-Stage Delta-Sigma Interpolator and Current-Steering DAC", 2005, Digest of Technical Papers, 2005 Symposium on VLSI Circuits.*
dSPACE, DS2302 Direct Digital Synthesis Board, 2005, Sales brochure, Catalog 2005.*
International Search Report dated Apr. 29, 2008 w/ English translation.
Written Opinion of the International Searching Authority with English translation.
DSPACE GMBH: "DS2302 Direct Digital Synthesis Board," Catalog 2005, [Online] 2005, pp. 260-265, XP002429799, Retrieved from the Internet: URL:http://maw.dspace.de/shated/data/pdf/katalog2005/dspace-catalog2005_ds2302,pdf>.
E. Murphy, et al., "Ask the application engineer 33—all about direct digital synthesis," [Online] Aug. 17, 2004, XP002429800, Retrieved from the Internet:URL:http://www.analog.com/library/analogDialogue/archives/38-08/dds.html>.

* cited by examiner

*Primary Examiner* — Omar Fernandez Rivas
*Assistant Examiner* — Herng-Der Day
(74) *Attorney, Agent, or Firm* — Dickinson Wright PLLC

(57) ABSTRACT

The invention concerns a sensor simulation system. The simulation system (1) comprises a generator (3) that generates a digital signal by direct digital frequency synthesis, based on the following parameters: a frequency, an amplitude, a phase and amplitude shift; a digital/analog converter (4), and a means (6) that modulates the signal received from said converter (4).

6 Claims, 2 Drawing Sheets ated Circuits type;
SENSOR SIMULATION SYSTEM

FIELD OF THE INVENTION

The present invention relates to a simulation system for simulating the operation of a sensor designed to convert physical parameters into electrical signals.

BACKGROUND OF THE INVENTION

Although not exclusively, such a simulation system is in particular suited to simulating the functioning of a sensor of the LVDT (Linear Variable Differential Transformer), LVT (Linear Variable Transformer), RVDT (Rotary Variable Differential Transformer), RVT (Rotary Variable Transformer) or RESOLVER type. It is known that such known sensors are used to convert (linear, angular) movements and angular velocities into electrical signals. These sensors have their application especially in the aeronautical field, more particularly with the following functions: cylinder rod extension, control surface position, movement and position of servo valve slide, engine speed, etc. Interest in these sensors is based on the fact that the position and/or movement are obtained by amplitude modulation. This technology allows in particular good immunity to noise and to electromagnetic disturbances. More precisely:

- an LVDT sensor is a transformer that modulates a voltage proportional to the movement of a ferromagnetic core. This sensor comprises a primary coil fed by an alternating excitation signal and two secondary coils. The core slides inside these coils, channels the flux and generates voltages in each secondary coil, the amplitudes of which depend on the position of this core;
- an RVDT sensor is similar to an LVDT sensor, but it uses a rotating ferromagnetic core;
- LVT and RVT sensors are LVDT and RVDT sensors respectively, but equipped with a single secondary coil; and
- a RESOLVER sensor comprises, instead of a ferromagnetic core, an excitation playing the role of a rotor, and two secondary windings positioned at 90° so as to play the role of stators.

These various sensors are the links in a servocontrol system, the control laws of which are executed by a computer.

SUMMARY OF THE INVENTION

The present invention relates to a simulation system which enables such a sensor to be simulated and which can in particular be used to validate the aforementioned control laws, or to automate test procedures, or else to test boundary conditions for particular applications that are difficult to reproduce with real sensors, such as an injection of noise and of phase shift or the possible combination of information.

To this end, according to the invention, said simulation system for simulating the operation of a sensor intended to convert digitized physical parameters into electrical signals is notable in that it comprises at least one simulation assembly that comprises:

- a generator that enables generation, by direct digital frequency synthesis, of a digital signal taking account of at least the following parameters: a frequency, an amplitude, a phase and an amplitude offset;
- a digital-analog converter that converts the digital signal generated by said generator into an analog signal; and
- a calculation means:
  - that produces a modulation of the analog signal received from said converter so as to form an electrical signal capable of simulating the operation of said sensor; and
  - that transmits the electrical signal thus formed.

Thus, thanks to the invention and as specified below, a sensor simulation system is obtained having many advantages, and in particular:

- obtaining an integrated and inexpensive system that can be integrated in a programmable component or in an integrated circuit of the ASIC (Application Specific Integrated Circuits type;
- the possibility of simulating a complete aircraft with several modules synchronized with one another;
- obtaining high performance, in particular with frequency precision, an instantaneous frequency jump and control of inter-channel phase shift; and
- the possibility of simulating equipment failure cases such as the loss of a winding, harmonic distortion, inter-channel attenuation, crosstalk, and a fault in generating the excitation.

The simulation system according to the invention may in particular be used to simulate the operation of a sensor of any of the aforementioned LVDT, LVT, RVDT, RVT and RESOLVER types. However, this simulation system may also be used to simulate the operation of a sensor intended to measure at least one particular parameter of an aircraft, such as a wheel speed, mass fuel rate of flow, vibrations and/or an engine speed.

In the context of the present invention, and depending on the type of sensor that the simulation system has to simulate, the latter comprises:

- either a single simulation assembly of the aforementioned type;
- or a plurality of simulation assemblies of the aforementioned type, which are then mounted in parallel.

In the latter case, said simulation system advantageously comprises, in addition, a single generation means able to generate a carrier that allows a modulation to be produced and which is linked to all the calculation means of said simulation system, along with a synchronization means (which synchronizes the various generators).

In a preferred embodiment, said generator of a simulation assembly comprises:

- a phase accumulator which produces frequency modulation of a signal;
- a phase shifter which produces a phase modulation of the signal received from the phase accumulator;
- a memory which includes a wave table that contains the binary description of the synthesized signal and which produces a phase-amplitude transformation of this signal;
- an attenuator which produces an amplitude modulation of the signal received from said memory; and
- an addition means which allows an amplitude offset to be added to the signal received from said attenuator and which transmits the resulting signal.

Furthermore, in one particular embodiment, said generator may additionally comprise:

- a synchronization means enabling said generator to be put in parallel with other generators; and/or
- an interpolator allowing improvement of the signal/noise ratio of the output signal from said generator; and/or
- a recitation means allowing the lower frequency limits on sinusoidal signals to be reduced without at the same time changing the design parameters such as the size of the wave table and the frequency of the system. Hence, without changing these two design parameters, this means ins capable of attaining frequencies two to four times lower; and/or a switching means enabling switching of an amplitude modulation source; and/or a noise-limiting means enabling digital noise limitation for the output signal from said generator.

BRIEF DESCRIPTION OF THE DRAWINGS

The figures of the appended drawing enable it to be well understood how the invention may be produced. In these figures, identical references designate like elements.

DETAILED DESCRIPTION OF THE INVENTION

Figure 1:
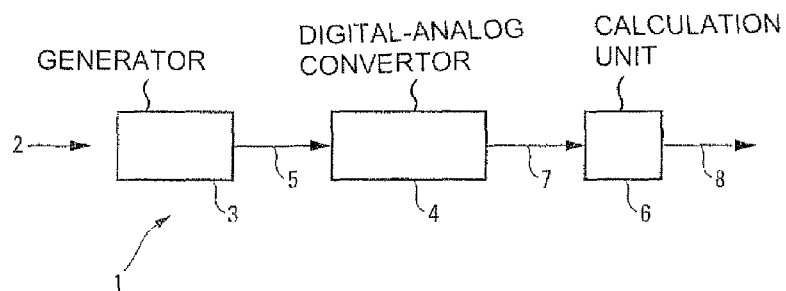
FIGS. 1 and 2 are overview diagrams of a simulation system according to the invention, in two different embodiments respectively.
Figure 2:
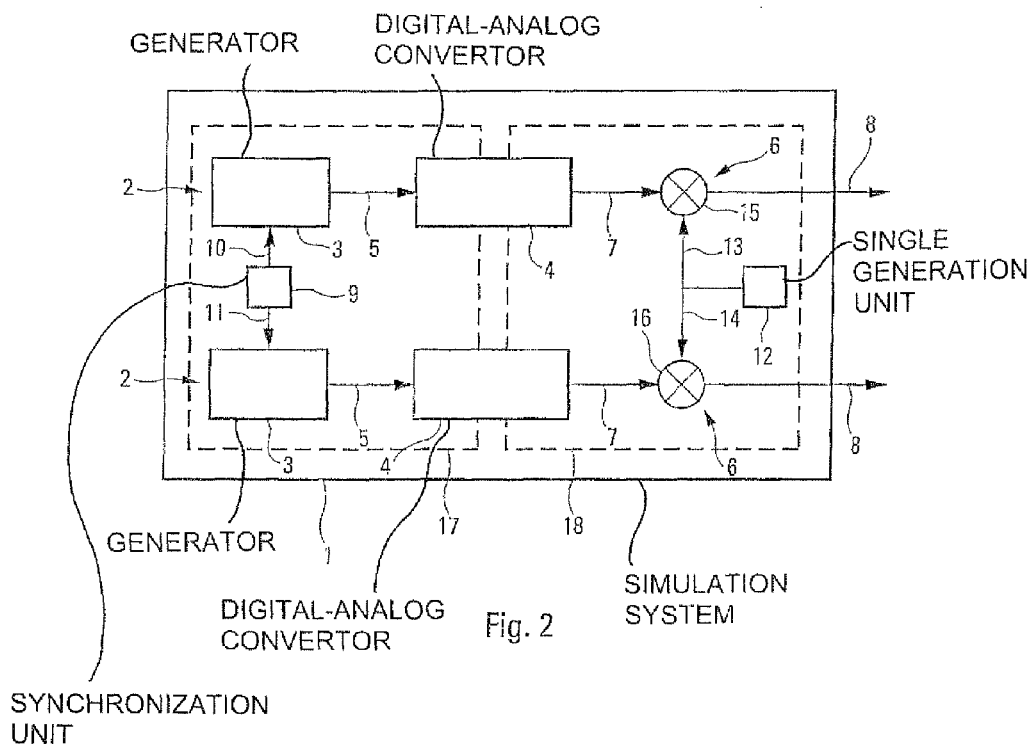

The simulation system 1 according to the invention and schematically represented in different embodiments in FIGS. 1 and 2 is intended to simulate the operation of a sensor (not shown) which has the object, generally speaking, of translating physical parameters into electrical signals.

To do this, said simulation system 1 comprises at least one simulation assembly 2, as represented in FIG. 1, which comprises:

a generator 3 that enables generation, by direct digital frequency synthesis of the DDS (Direct Digital Synthesis) type, of a digital signal taking account of at least the following parameters: a frequency, an amplitude and a phase (and generally also an amplitude offset and a gain);

a digital-analog converter 4 of the usual type, which is connected by means of a connection 5 to said generator 3 and which converts the digital signal generated by this generator 2 into an analog signal; and a calculation means 6:
that is connected by means of a connection 7 to said digital-analog converter 4;
that produces a modulation of the analog signal received from said converter 4 so as to form an electrical signal capable of simulating the operation of said sensor; and
that transmits the electrical signal thus formed by means of a connection 8 to a user device (not shown).

Thus, thanks to the invention and as specified below, a sensor simulation system 1 is obtained that brings many advantages, and in particular:

obtaining an integrated and inexpensive system that can be integrated in a programmable component or in an integrated circuit of the ASIC (Application Specific Integrated Circuit) type;

the possibility of simulating a complete aircraft with several modules synchronized with one another;

obtaining high performance, in particular with frequency precision, an instantaneous frequency jump and control of the inter-channel phase shift; and the possibility of simulating equipment failure cases such as a loss of a winding, harmonic distortion, inter-channel attenuation, crosstalk, and a fault in generating the excitation.

The simulation system 1 according to the invention may in particular be used to simulate the operation of a sensor of any of the following usual types: LVDT, LVT, RVDT, RVT and RESOLVER.

It is known that:

an LVDT sensor is a transformer that modulates a voltage proportional to the movement of a ferromagnetic core. This sensor comprises a primary coil fed by an alternating excitation signal and two secondary coils. The core slides inside these coils, channels the flux and generates voltages in each secondary coil, the amplitudes of which depend on the position of this core;

an RVDT sensor is similar to an LVDT sensor, but it uses a rotating ferromagnetic core;

LVT and RVT sensors are LVDT and RVDT sensors respectively, but equipped with a single secondary coil; and a RESOLVER sensor comprises, instead of a ferromagnetic core, an excitation playing the role of a rotor, and two secondary windings positioned at 90° so as to play the role of stators.

However, the simulation system 1 according to the invention may also be used to simulate sensors intended to measure particular parameters of an aircraft, such as a wheel speed, mass fuel rate of flow, vibrations and/or an engine speed.

Said simulation system 1 which enables a sensor to be simulated can in particular be used:

to validate control laws for a servocontrol system including such a sensor; and/or to automate test procedures; and/or to test boundary conditions for particular applications that are difficult to reproduce with real sensors, such as an injection of noise and of phase shift or the possible combination of information.

In the context of the present invention, and depending on the type of sensor that the simulation system 1 has to simulate, the latter comprises:

either a single simulation assembly 2 of the aforementioned type, as shown in FIG. 1;

or a plurality of simulation assemblies 2 of the aforementioned type, which are then mounted in parallel, as shown in FIG. 2.

In the exemplary embodiment of FIG. 2 the simulation system 1 comprises two simulation assemblies 2 (such as the simulation assembly 2 represented in FIG. 1), along with, in particular, the following elements:

a customary synchronization means 9 which is connected by means of connections 10 and 11 to each of the generators 3 of said two simulation assemblies 2. This synchronization means 9, comprising for example a customary clock, synchronizes the two simulation assemblies 2; and a single generation means 12 which is connected by means of connections 13 and 14 respectively to multiplication means 15 and 16. This generation means 12 and a multiplication means 15, 16 form said calculation means 6. This generation means 12 generates a carrier Ve(t) [(of the type, for example, Ve(t) A sin(WO.t) where A and WO are predetermined parameters and t represents time)] which is multiplied by the output signal of each of the converters 4 [K1($t$) and K2($t$) respectively] so as to obtain the following output signals V1($t$) and V2($t$) at the output of said simulation assemblies 2:

$$V1(t) = K1(t) A \sin(WO \cdot t)$$

$$V2(t) = K2(t) A \sin(WO \cdot t)$$

The multiplication means 15, 16 may be digital or be produced by the reference inputs of the digital-analog converter.

It will be noted that the synchronization means 9 allows the phase shift between the signals V1(t) and V2(t) and the simultaneous evolution of parameters such as the frequency to be controlled.

FIG. 2 depicts with the aid of dotted-line rectangles 17 and 18 the digital part and the analog part respectively of said simulation system 1.

Of course, said simulation system 1 may comprise a different number (three, four, etc.) of simulation assemblies 2.

Figure 3:
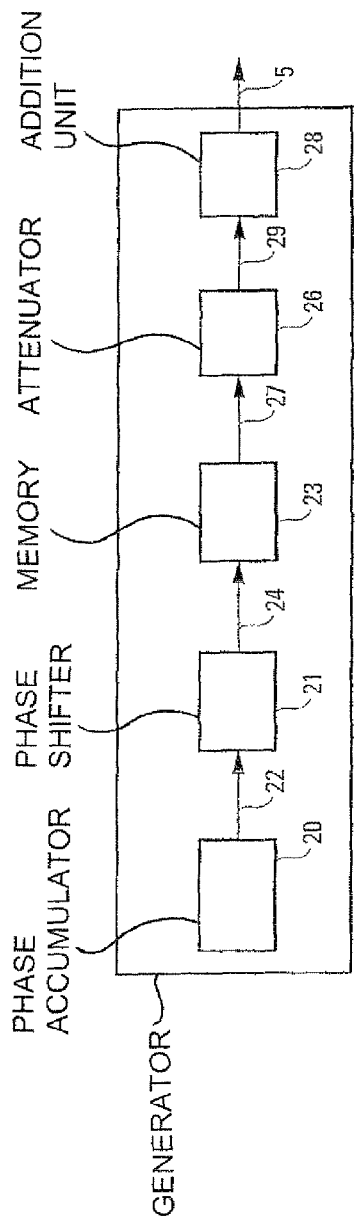
FIG. 3 is the overview diagram of an embodiment based on a generator that is part of a simulation system according to the invention.

Moreover, in a preferred embodiment, the generator 3 of each simulation assembly 2 of the simulation system 1 according to the invention comprises, as shown in FIG. 3:

- a phase accumulator 20 which produces frequency modulation of a signal;
- a phase shifter 21 which is connected by means of a connection 22 to said phase accumulator 20 and which produces a phase modulation of the signal received from said phase accumulator 20;
- a memory 23 which is connected by means of a connection 24 to said phase shifter 21. This memory 23 includes a wave table that contains the binary description of the synthesized signal. It produces a phase-amplitude transformation of the signal;
- an attenuator 26 which is connected by means of a connection 27 to said means 23 (memory) and which produces an amplitude modulation of the signal received from said means 23; and
- an addition means 28 which is connected by means of a connection 29 to said attenuator 26, which allows an amplitude offset to be added to the signal received from this attenuator 26 and which transmits the resulting signal by means of the connection 5.

Said generator 3 employs an electronic function that enables the generation of an arbitrary electrical waveform. The basic principle consists in reciting a wave table and in generating an electrical signal from the following numerical parameters:

- a frequency;
- an amplitude;
- a phase; and
- an amplitude offset.

It will be noted that on the generator 3 of FIG. 3 there is an input (not shown) to the means 20, 21, 23, 26 and 28, coming from the outside and corresponding respectively to the aforementioned parameter (frequency, phase, description of the wave table, gain/amplitude, offset).

In the context of the present inventions the "reciting" of a wave table represents a technique of searching the wave table. In the same way as reading a page the direction is from top to bottom. The machine proceeds in the same way to read the wave table in order to recite the latter. The phase accumulator scans the addresses in the table, from the lowest address to the highest address by incrementation. The incrementation rate is a function of the frequency of the signal to be generated. The higher the frequency, the faster the recitation. An instantaneous amplitude of the output signal corresponds to each address in the table. The output signal is thus frequency modulated.

The phase accumulator 20 is the core of said generator 3. This phase accumulator 20 is an N-bit register (N=M+T) the incrementation rate of which is fixed by an M-bit register and a clock frequency Fosc. The T most significant bits of the phase accumulator 20 enable the memory 23 to be addressed.

The phase accumulator 20 receives a binary code TW (for Tuning Word) that corresponds to the frequency of the synthesized output signal. This binary code TW fixes the scanning rate of the phase and hence the frequency of the signal generated. The phase accumulator 20 arithmetically adds the binary code relative to the preceding result. Hence, for a binary code TW and a duration n the output from the accumulator 20 may correspond to the following value: (n+1).TW The result of the output from the accumulator 20 therefore corresponds to a ramp, the slope of which depends on the value of the binary code TW. The size of the binary word output from the phase accumulator 20 is more limited, for example to 32 bits.

Consequently, at each moment a change (made by an operator) in the value of the binary code TW enables a modification in the slope of the phase accumulator 20, and thus a modification in the output frequency.

For technological reasons, the output from the phase accumulator 20 is truncated, since a position on a trigonometric circle corresponds to each instantaneous output value. So only the upper part of the result from the phase accumulator 20 is preserved. The output signal is consequently composed of two parts:

- an upper part which corresponds to the instantaneous phase of the output signal; and
- a truncated part which is preserved for the phase accumulator 20 feedback in order to limit the effects of the truncation (rounding).

In addition, the phase shifter 21 adds the upper part of the output signal from the phase accumulator 20 to a register containing an instantaneous phase so as to produce a phase modulation. The value q added is between 0° and 360°.

Moreover, the memory 23 contains the binary description of the synthesized signal. The content of this memory is arbitrary. The size of this memory 23 is by contrast fixed by the size of the truncation at the output from the phase accumulator 20. So the size T of the memory 23 conforms to the following rule:

$$T=2^{N-M}$$

in which:

N is the size of the binary code TW; and

M is the size of the truncated part at the output from the phase accumulator 20.

The output from the phase shifter 21 plays the role of a pointer on the wave table. The searching of this wave table is more or less quick depending on the value of the binary code TW at the input to the phase accumulator 20.

In addition, the amplitude modulator or attenuator 26 that is located at the output from the wave table receives the instantaneous amplitude of the synthesis signal, as information, from the wave table. This attenuator 26 multiplies an amplitude modulation register with the output from the means 23.

The memory 23 stores a configurable waveform which is recited at the rate of the phase accumulator 20. By way of example, this waveform may be sinusoidal, triangular, or of any other type.

When the generator 3 has to transmit to its output a signal So of the form:

$$So=A\sin(\theta t+\phi)+B$$

it is formed so as to generate:

- a signal θt at the output from the phase accumulator (defining the frequency);
- a signal θt+φ at the output from the phase shifter 21 (producing a phase shift of value φ);

a signal sin (θt+φ) at the output from means 23 (defining the waveform, for example sinusoidal ["sin"] in type);

a signal A sin(θt+φ) at the output from the attenuator 26 (producing an amplitude modulation with the value A); and said signal A sin(θt+φ)+B at the output from the addition means 28 (producing an amplitude offset of value B).

Figure 4:
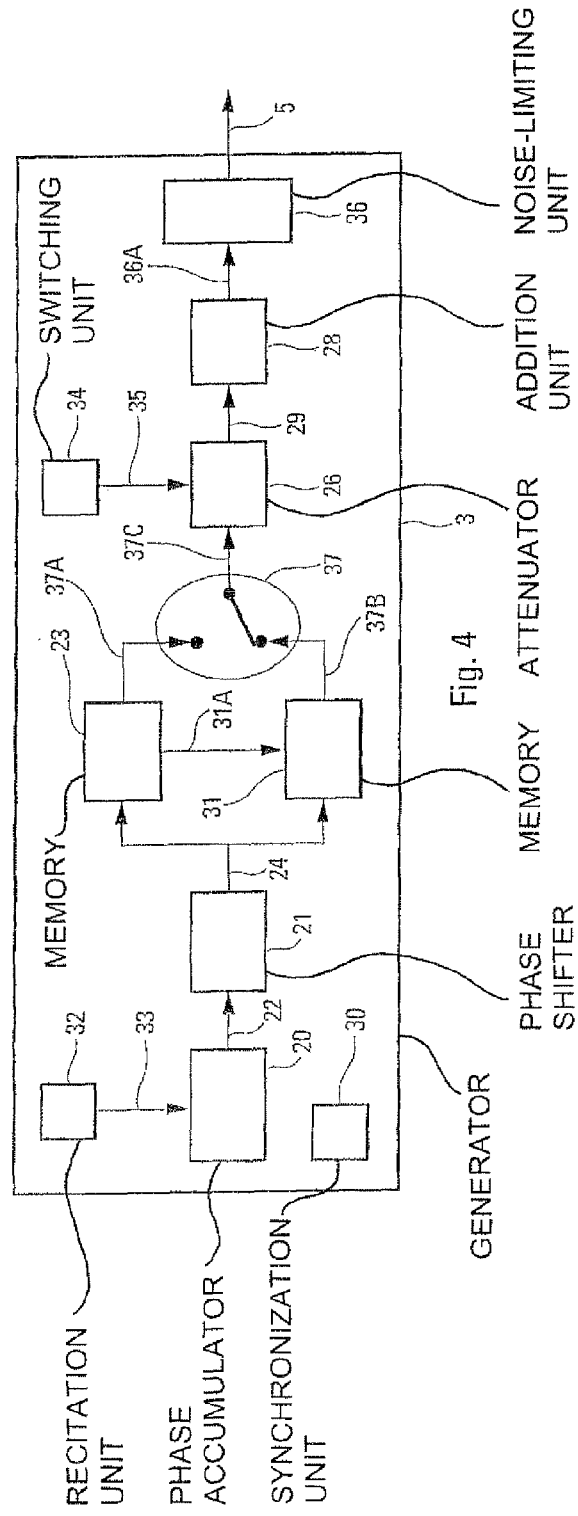
FIG. 4 schematically illustrates a particular embodiment of a generator that is part of a simulation system according to the invention.

Furthermore, in one particular embodiment represented in FIG. 4, said generator 3 additionally comprises:

a synchronization means 30 enabling said generator 3 to be put in parallel with other generators. The modes of synchronization available are, in particular: time synchronization, frequency synchronization, event synchronization (triggering);

an interpolator 31 (linear, second order, etc.) which is connected, for example, by means of connections 31A and 24 respectively to the means 23 and to the phase shifter 21 and which allows improvement of the signal/noise ratio without at the same time changing the size of the wave table. The calculation of the interpolation is based on the fractional part from the phase accumulator 20. This interpolator 31 is mounted in parallel with the means 23 and is associated with a selection means 37 that is connected by means of connections 37A, 37B and 37C respectively to the means 23, 31 and 26;

a recitation means 32 which is, for example, connected means of a connection 33 to said phase accumulator 20 and which allows several modes of reciting the wave table in order to reduce the lower frequency limits on sinusoidal waveforms without at the same time changing the binary resolution of the generator 3;

a switching means 34 which is, for example, connected by means of a connection 35 to said attenuator 26 and which enables switching of the amplitude modulation source, either internally (digital modulation) or through the acquisition of an external reference voltage; and a noise-limiting means 36 which is mounted downstream of said addition means 28 (to which it is, for example, connected by means of a connection 36A) and which enables digital noise limitation for the output signal so as to free it from jumps due to possible sign bit errors.

The invention claimed is:

1. A simulation system for simulating an operation of a sensor intended to convert digitized physical parameters into electrical signals, said simulation system comprising:
   (a) a first simulation assembly; and
   (b) a second simulation assembly arranged in parallel with the first simulation assembly, wherein each of the first and second simulation assemblies comprises:
      a generator that generates, by direct digital frequency synthesis, a digital signal taking account of at least the following parameters: a frequency, an amplitude, a phase and an amplitude offset;
      a digital-analog converter that converts the digital signal generated by said generator into an analog signal;
      an interpolator that improves signal/noise ratio of an output signal from said generator; and
      a calculation unit including a multiplication unit that modulates the analog signal received from said converter with a carrier signal to form an electrical signal that simulates the operation of said sensor, and transmits the electrical signal to a user device; and
   (c) a single generation unit, linked to said multiplication unit of each of the first and second simulation assemblies, which generates the carrier signal, wherein:
   the generator comprises a phase accumulator which produces frequency modulation of a signal, and the phase accumulator is configured to receive a binary code that corresponds to the frequency of said electrical signal that simulates the operation of said sensor and that fixes a scanning rate of the phase.

2. The simulation system according to claim 1, wherein at least one generator of the simulation assemblies in parallel comprises:
   a phase shifter which produces a phase modulation of the signal received from the phase accumulator;
   a memory which produces a phase-amplitude transformation of the phase modulated signal received from the phase shifter from a binary wave table;
   an attenuator which produces an amplitude modulation of the phase transformed signal received from said memory; and
   an addition unit which adds an amplitude offset to the amplitude modulated signal received from said attenuator and which transmits the resulting signal.

3. The simulation system according to claim 2, wherein said generator further comprises a recitation unit linked to said phase accumulator that reduces lower frequency limits on sinusoidal waveforms of the signal produced by the phase accumulator.

4. The simulation system according to claim 2, wherein said generator further comprises a switching unit linked to the attenuator that switches a source of the received phase-amplitude transformed signal to the attenuator.

5. The simulation system according to claim 2, wherein said generator further comprises a noise limiting unit that limits digital noise for the output signal from said generator.

6. A simulation system for simulating an operation of a sensor intended to convert digitized physical parameters into electrical signals, said simulation system comprising:
   (a) a first simulation assembly; and
   (b) a second simulation assembly arranged in parallel with the first simulation assembly, wherein each of the first and second simulation assemblies comprises:
      a generator that generates, by direct digital frequency synthesis, a digital signal taking account of at least the following parameters: a frequency, an amplitude, a phase and an amplitude offset,
      wherein said generator comprises:
         a phase accumulator which produces frequency modulation of a signal,
         a phase shifter which produces a phase modulation of the signal received from the phase accumulator,
         a memory which produces a phase-amplitude transformation of the phase modulated signal received from the phase shifter from a binary wave table,
         an attenuator which produces an amplitude modulation of the phase transformed signal received from said memory,
         an addition unit which adds an amplitude offset to the amplitude modulated signal received from said attenuator and which transmits the resulting signal, and
         a recitation unit linked to said phase accumulator that reduces lower frequency limits on sinusoidal waveforms of the signal produced by the phase accumulator;
      a digital-analog converter that converts the digital signal generated by said generator into an analog signal; and
      a calculation unit including a multiplication unit that modulates the analog signal received from said converter with a carrier signal to form an electrical signal that simulates the operation of said sensor, and transmits the electrical signal to a user device, wherein the first and second simulation assemblies are linked together by:
a synchronization unit linked to each generator of the first and second simulation assemblies, which synchronizes the first and second simulation assemblies, and
a single generation unit linked to each multiplication unit of the first and second simulation assemblies, which generates the carrier signal,
wherein the phase accumulator is configured to receive a binary code that corresponds to the frequency of said electrical signal that simulates the operation of said sensor and that fixes a scanning rate of the phase.

\* \* \* \* \*